UNITED STATES PATENT OFFICE.

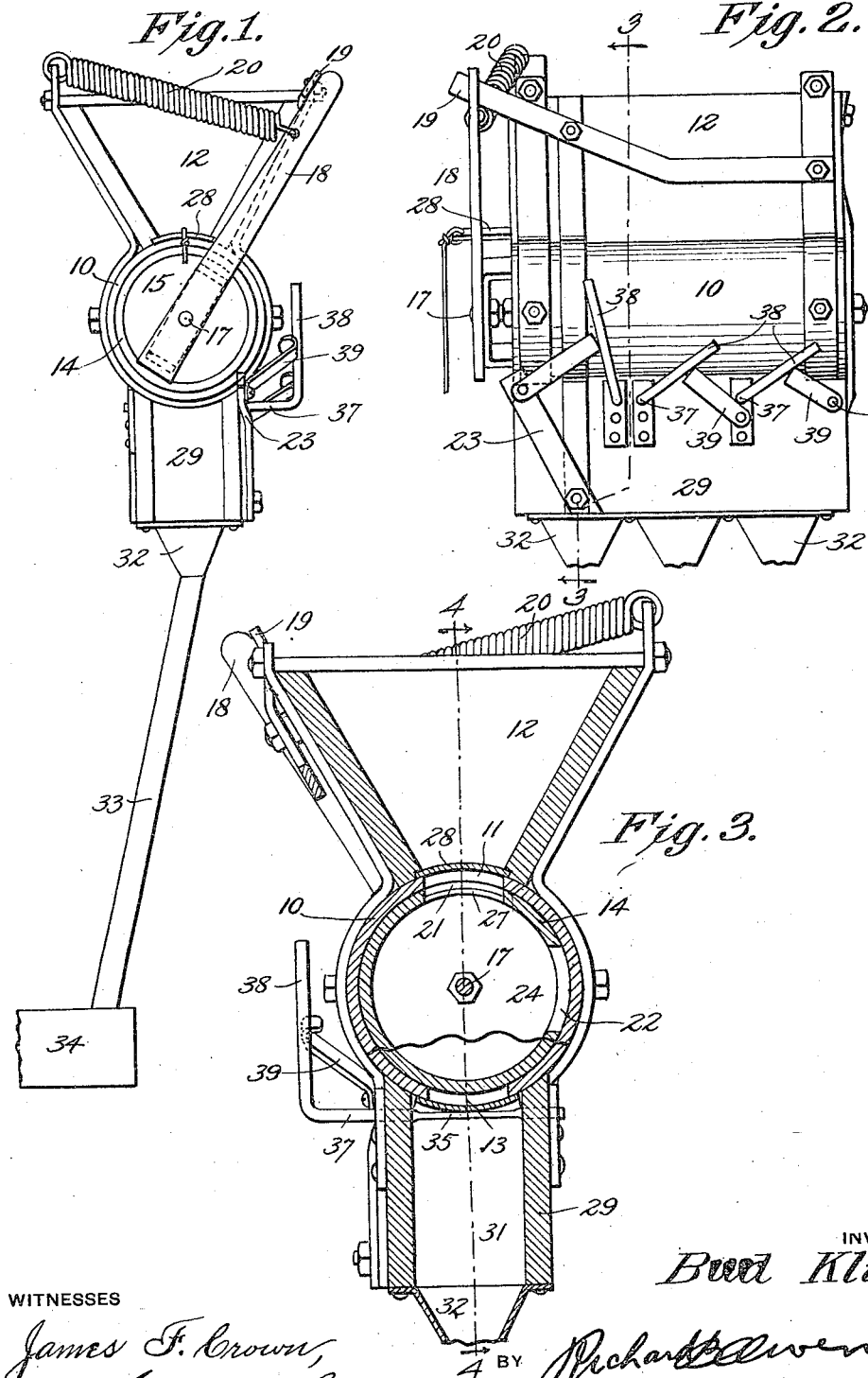

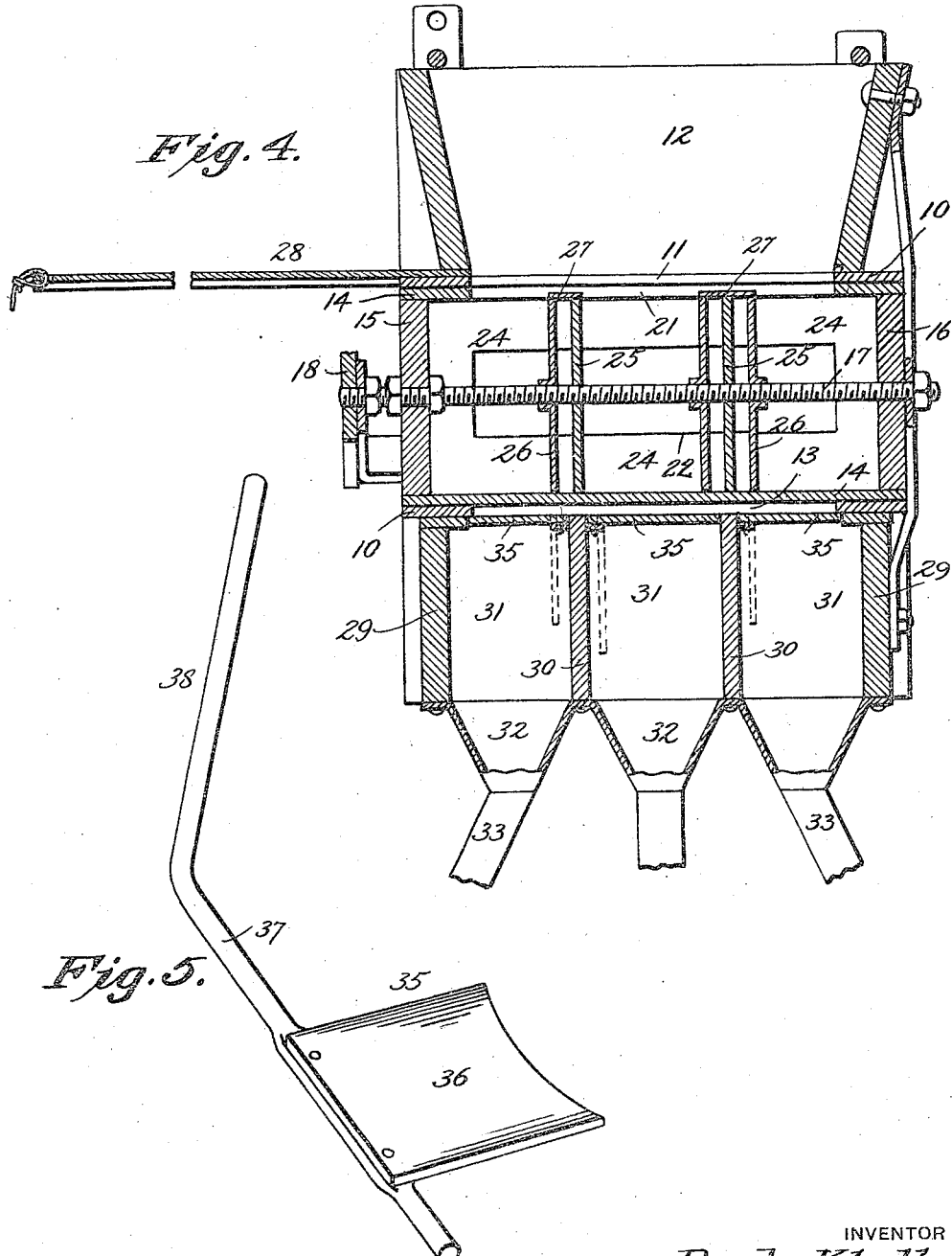

BUD KLUTTS, OF EWING, NEBRASKA.

FEED-DISTRIBUTER.

1,263,074.  Specification of Letters Patent.  Patented Apr. 16, 1918.

Application filed October 24, 1916. Serial No. 127,468.

*To all whom it may concern:*

Be it known that I, BUD KLUTTS, a citizen of the United States, residing at Ewing, in the county of Holt and State of Nebraska, have invented certain new and useful Improvements in Feed-Distributers, of which the following is a specification.

This invention relates to a feed distributer, and is designed particularly for automatically directing the flow of grain either whole, ground, or mixed from a storage receptacle, trough, or bin to one or more feed troughs in a stable or out-house occupied by the stock to be fed.

The invention has for its object to provide a grain feeding mechanism for the use of stockmen and poultry raisers for delivering measured quantities of granular feed to any number of stalls in a stable or stock house, said mechanism being provided with means for regulating the quantity delivered, and, when desired for interrupting the delivery to one of more feed troughs when the stall in which said trough is placed is empty owing to absence of the animal therefrom.

Another object of the invention is to provide a grain feeding mechanism adapted to automatically deliver quantities of feed to one or more feed troughs upon each manual operation of a measuring cylinder, and furthermore, providing said mechanism with means for independently regulating the quantity of feed at each operation to a given trough, and means for cutting off the delivery to any one or more troughs, as desired.

With the above as some of the principal objects in view, and others to be brought out more in detail hereinafter, the invention consists of the novel construction and arrangement of parts now to be described, pointed out in the appended claims and illustrated in the accompanying drawings, in which—

Figure 1 is an end elevation of the feeding and delivering mechanism,

Fig. 2 is a side elevation of the same,

Fig. 3 is a vertical sectional view on the line 3—3 of Fig. 2,

Fig. 4 is a central longitudinal sectional view on the line 4—4 of Fig. 3,

Fig. 5 is a perspective view of a detail of the invention.

In the drawings, 10 indicates the exterior cylinder of such length and diameter as may be required for the amount of stock to be fed, said cylinder being of substantially unlimited length. In the top of the cylinder 10 is formed a longitudinal opening 11 extending to within a short distance of the ends of the cylinder and having a width sufficient to permit feed such as grain, either whole, ground, or mixed to pass downwardly from a storage bin or hopper 12 into the cylinder. A similar slot or opening 13 having the same dimensions as the slot 11 is formed in the bottom of the cylinder 10.

Within the cylinder 10 is a second or measuring cylinder 14 having a length equal to the cylinder 10 and fitting snugly therein but adapted to rotate with as little friction as possible, the other cylinder forming a bearing for the inner cylinder. The ends of the cylinder 14 are closed by heads 15 and 16, through which heads passes a shaft 17 threaded from end to end as shown and rigidly secured to the heads so that the shaft and inner cylinder 14 rotate as one. The shaft 17 projects beyond the head 15 a short distance and has attached thereto a lever arm 18, by means of which the cylinder 14 may be given partial rotation within the cylinder 10. The lever 18 preferably projects upwardly above the outer cylinder 10 and is normally held in contact with a stop 19 by means of a spring 20 here shown as a coil spring, attached at one end to said lever and at its opposite end to the bin or hopper 12. A slot 21 is made in the inner cylinder 14 of the same length and width as the slot 11 in the outer cylinder 10 and is maintained normally below and coincident with said slot 11 when the lever 18 is in contact with the stop 19. A second slot 22 similar in proportion to the slot 21 is formed in one side of the inner cylinder 14 at such a point that when the slot 21 registers with the slot 11, the slot 22 will be out of registration with the slot 13 but when brought in registration therewith, the slots 11 and 21 will in turn be out of registration. A stop 23 fixed to the frame of the mechanism projects into the line of travel of the lever 18 and limits its downward movement when the slot 22 is brought into complete communication with the slot 13.

The inner cylinder 14 is divided into a plurality of cells or chambers 24 of equal size and holding capacity by diaphragms 25 fixed to the shaft 17. Into these cells the feed pours through the openings 11 and 21 from the bin 12 whenever the cylinder 14 is in its normal position, thus filling the cells preparatory to delivering the feed to the various stalls below. Under certain conditions, it is expedient and desirable to feed less grain to one or more animals than to the others, and for this purpose means are provided within each cell for lessening its capacity when necessary. This means consists of a circular plate of the same diameter as the interior of the cylinder 14 and threaded on the shaft 17 so that when rotated on said shaft it will move in one direction or the other dependent upon the direction of rotation and thus decrease or increase the volume of the cell within which it is situated. Each disk 26 is in contact with a diaphragm 25 when the full capacity of the cell is required, but is moved away therefrom at such distances as may be necessary when a less amount of feed is to be distributed. To prevent any feed passing between diaphragm and disk, there is a plate 27 spanning the slot 21 and extending from each diaphragm over the cell for a suitable distance, said plate covering the space between diaphragm and disk.

For the purpose of cutting one or more or all of the cells from the bin 12 there is provided a gate 28 at the bottom of said bin that slides longitudinally over the outer cylinder 10 above the slot 11 for the purpose of closing said slot. This slide as is evident may be moved endwise to close and cut off as many of the cells 24 as are necessary or desirable.

Below the outer cylinder 10 and rigidly connected thereto is a box 29 of a length substantially that of the cylinder and slightly wider exteriorly than the width of the slot 13. The box 29 is divided by transverse partitions 30 into a number of chambers 31, the partitions 30 being disposed below the partitions 25 within the inner cylinder 14 and thus the box is divided into as many chambers as the cylinder has cells. Through these chambers the feed falls from the cells above into the funnel-shaped upper ends 32 of chute 33 which convey the feed to the troughs 34 situated in the different stalls in the stable or out-house below. At the top of each chamber 31 is a valve 35 for closing the communication when desired between the cell 24 and the chamber below. These valves comprise plates 36 preferably curved in order to fit snugly against the exterior of the outer cylinder 10 and riveted at one end to a shaft 37 that extends transversely of the box 29 and is journaled in the walls thereof, one end of the shaft 29 being bent at an angle thereto to form an operating handle 38, by means of which the valve may be opened and closed. A spring stop 39 is provided for the handle of each shaft 37 to hold the valve closed but when disengaged from the stop, the weight of the valves and their handles is sufficient to hold them in open position.

In using the machine it is filled with the feed and the latter passing through the openings 11 and 21 in the cylinders 10 and 14 fills the cells 24 in the latter cylinder. If the full quantity of feed is to be delivered, the plates 26 are rotated on the shaft 17 until they lie in contact with the partitions 25 but if a smaller quantity of feed is required for one or more animals the plate will be run out on the screw shaft until the cell in which it is placed has had its capacity reduced to the desired amount.

The cells 24 having been filled the lever 18 is pulled downwardly until it strikes the strip 23, the movement being sufficient to aline the opening 22 in the cylinder 14 with the opening 13 in the outer cylinder 10 whereupon the feed in the cells will, if the valves 35 are opened, fall through the receptacles 31 of the box 29 into the chute 33 and from thence to the various feed troughs 34. Should one or more stalls containing a feed trough 34 be without an occupant owing to the absence of the animal that is usually fed in said stall the valve will remain closed, but otherwise the valve will be opened by disengaging the handle 38 of said valve from the spring strip 39, permitting the valve to drop into the position shown in dotted lines in Fig. 4, thus providing unimpeded passage ways between the downwardly open cells and the chutes 33. The bin 12 if desired may be wholly cut off from the cylinders 10 and 14 by pushing the gate 28 inward to its full extent or only a limited number of the cells 24 may be permitted to remain open by operating the gate 28 to cut off such cells as it is not desired to fill. It is to be understood that the number of cells 24 and chutes 33 may be increased indefinitely to suit the number of animals to be fed, it being only necessary to lengthen the machine and subdivide the cylinder into the number of cells desired.

What I claim is:

1. In a distributer for granular material, the combination of a storage receptacle, a fixed cylinder below and communicating with the same and having an exit opening at the bottom, an oscillating measuring receptacle divided into a plurality of independent measuring cells within said cylinder and adapted to receive the material from a common storage receptacle and deliver it to the exit opening in the cylinder, and means below the cylinder to separately direct the flow of material from each cell.

2. In a distributer for granular material, the combination of a storage receptacle, a fixed cylinder below and communicating with the same and having an exit opening at the bottom, an oscillating measuring receptacle divided into a plurality of independent measuring cells mounted in the cylinder and adapted to receive granular material from the storage receptacle and deliver it through the exit opening in the cylinder, adjustable means in each of said cells for varying its capacity, means below the cylinder to direct the flow of material from each of said cells, a sliding gate between the storage receptacle and the cylinder for controlling the flow of material from the said receptacle to one or more of said cells, and a valve below each cell and independently operable to control the outlet from said cell into the directing means below.

3. In a feed distributer, the combination of a storage receptacle, a fixed cylinder below and communicating with the same and having an exit opening at the bottom, a gate adapted to close communication between said storage receptacle and the cylinder, an oscillating receptacle divided into a plurality of independent measuring cells within said cylinder and adapted to receive feed from the storage receptacle and deliver it through the exit opening in the cylinder, means below the cylinder communicating each with a cell to direct the flow of feed therefrom, and a valve for controlling the outlet from each cell.

4. In a feed distributer, the combination with a storage receptacle, a fixed cylinder below and communicating with the same and having an exit opening at the bottom, an oscillating measuring receptacle divided into a plurality of independent measuring cells within said cylinder and adapted to receive feed from the storage receptacle and deliver it through the exit opening in the cylinder, a threaded shaft to which said measuring receptacle is fixed, means within each of said cells and mounted upon said threaded shaft for varying the capacity of the containing cell and a plurality of chutes below the cylinder, said chutes communicating each with a cell to direct the flow of feed therefrom.

5. In a feed distributer, the combination of a storage receptacle, a fixed cylinder below and communicating with the same and having an exit opening at the bottom, an oscillating measuring receptacle in the cylinder divided into a plurality of independent measuring cells and adapted to receive feed from the storage receptacle and deliver it through the exit opening in the cylinder, a box below the cylinder divided into chambers equal in number to the cells in the measuring receptacle and each communicating with a cell, a cut-off valve in each of said chambers controlling the outflow of material from the cell above, and a chute leading from each chamber to direct the flow of feed therefrom.

In testimony whereof I affix my signature in presence of two witnesses.

BUD KLUTTS.

Witnesses:
GUSTAV DANIELS,
LIZZIE DANIELS.

Copies of this patent may be obtained for five cents each, by addressing the "Commissioner of Patents, Washington, D. C."